United States Patent
Riou (10) Patent No.: US 10,282,312 B2
(45) Date of Patent: May 7, 2019

(54) INTEGRATED CIRCUIT, METHOD FOR PROTECTING AN INTEGRATED CIRCUIT AND COMPUTER PROGRAM PRODUCT

(71) Applicant: NXP B.V., Eindhoven (NL)

(72) Inventor: Sebastien Riou, Seongnam si (KR)

(73) Assignee: NXP B.V., Eindhoven (NL)

( * ) Notice: Subject to any disclaimer, the term of this patent is extended or adjusted under 35 U.S.C. 154(b) by 246 days.

(21) Appl. No.: 15/268,462

(22) Filed: Sep. 16, 2016

(65) Prior Publication Data

US 2017/0083459 A1   Mar. 23, 2017

(30) Foreign Application Priority Data

Sep. 23, 2015   (EP) .................................... 15290240

(51) Int. Cl.
| | |
|---|---|
| *G06F 12/14* | (2006.01) |
| *H04L 29/06* | (2006.01) |
| *G06K 19/073* | (2006.01) |
| *G07F 7/08* | (2006.01) |
| *H01L 23/00* | (2006.01) |

(Continued)

(52) U.S. Cl.
CPC ...... *G06F 12/1466* (2013.01); *G06F 12/1408* (2013.01); *G06F 21/316* (2013.01); *G06F 21/602* (2013.01); *G06F 21/86* (2013.01); *G06K 19/073* (2013.01); *G06K 19/07372* (2013.01); *G07F 7/082* (2013.01); *G09C 1/00* (2013.01); *H01L 23/573* (2013.01); *H01L 23/576* (2013.01); *H04L 9/004* (2013.01);

(Continued)

(58) Field of Classification Search
CPC ......... H04L 9/00; H04L 21/00; H04L 9/0869; H04L 9/08; H04L 29/06; G06F 12/1466; G06F 21/00; G06F 12/1408; G06F 12/14; H01L 23/576; H01L 23/573; H01L 23/5225; G07F 7/082; G06K 19/073; G06K 19/07372

USPC ................................ 713/193, 189, 192, 194
See application file for complete search history.

(56) References Cited

U.S. PATENT DOCUMENTS

| | | | |
|---|---|---|---|
| 6,047,068 A | 4/2000 | Rhelimi et al. | |
| 6,962,294 B2 * | 11/2005 | Beit-Grogger | ........ H01L 23/576 235/487 |

(Continued)

FOREIGN PATENT DOCUMENTS

WO   WO 98/18102   4/1998

OTHER PUBLICATIONS

Extended European Search Report for Patent Appln. No. 15290240.9 (dated Mar. 10, 2016).

(Continued)

*Primary Examiner* — Ashokkumar B Patel
*Assistant Examiner* — Quazi Farooqui (57) ABSTRACT

According to a first aspect of the present disclosure, an integrated circuit is provided which comprises an active shield in a first layer and at least one security-critical component in a second layer, said security-critical component being configured to generate an access key for enabling access to at least a part of said security-critical component, wherein said access key is based on an output value of the active shield. According to a second aspect of the present disclosure, a corresponding method for protecting an integrated circuit is conceived. According to a third aspect of the present disclosure, a corresponding computer program product is provided.

17 Claims, 4 Drawing Sheets

(51) Int. Cl.
*G06F 21/31* (2013.01)
*G06F 21/60* (2013.01)
*G06F 21/86* (2013.01)
*G09C 1/00* (2006.01)
*H04L 9/00* (2006.01)
*H04L 9/08* (2006.01)
*H01L 23/522* (2006.01)

(52) U.S. Cl.
CPC .... *H04L 9/0866* (2013.01); *G06F 2221/2133* (2013.01); *H01L 23/5225* (2013.01)

(56) References Cited

U.S. PATENT DOCUMENTS

| | | | |
|---|---|---|---|
| 7,555,787 | B2 | 6/2009 | Clercq |
| 8,504,848 | B2 * | 8/2013 | Starr .................. H04L 9/003 380/277 |
| 2001/0033012 | A1 | 10/2001 | Koemmerling et al. |
| 2003/0132777 | A1 | 7/2003 | Laackmann et al. |
| 2003/0218475 | A1 | 11/2003 | Gammel |
| 2007/0121575 | A1 | 5/2007 | Savry |
| 2008/0244749 | A1 | 10/2008 | Derouet |
| 2009/0001821 | A1 | 1/2009 | Walker et al. |
| 2009/0024890 | A1 | 1/2009 | Cutrignelli et al. |
| 2012/0117645 | A1 * | 5/2012 | Na .......................... G06F 21/87 726/22 |
| 2012/0319724 | A1 | 12/2012 | Plusquellic et al. |
| 2013/0141137 | A1 | 6/2013 | Krutzik et al. |
| 2014/0049359 | A1 | 2/2014 | Riou |
| 2015/0007353 | A1 | 1/2015 | Widdershoven et al. |
| 2015/0137380 | A1 | 5/2015 | in 't Zandt et al. |
| 2016/0028722 | A1 * | 1/2016 | Kocher ................... H04L 9/083 713/156 |

OTHER PUBLICATIONS

Briais, S. et al. "Random Active Shield", Workshop on Fault Diagnosis and Tolerance in Cryptography, pp. 103-113 (Sep. 9, 2012).

Pappu, R. et al. "Physical One-Way Functions", Science, vol. 297, No. 5589, pp. 2026-2030 (Sep. 20, 2002).

* cited by examiner

INTEGRATED CIRCUIT, METHOD FOR PROTECTING AN INTEGRATED CIRCUIT AND COMPUTER PROGRAM PRODUCT

CROSS-REFERENCE TO RELATED APPLICATIONS

This application claims the priority under 35 U.S.C. § 119 of European patent application no. 15290240.9, filed on Sep. 23, 2015, the contents of which are incorporated by reference herein.

FIELD

The present disclosure relates to an integrated circuit. Furthermore, the present disclosure relates to a corresponding method for protecting an integrated circuit and to a corresponding computer program product.

BACKGROUND

Today, security plays an important role in many electronic devices and computing environments. For example, electronic devices such as smart cards and electronic identification documents often contain integrated circuits (ICs) in which sensitive data are stored, such as private information and secret keys, which may enable transactions with commercial and governmental organizations. Examples of electronic identification documents are electronic passports (e-passports) and electronic identification cards (eIDs). In order to protect these sensitive data, more specifically in order to prevent that unauthorized persons access these data, many techniques have been developed. However, there are also many techniques to breach the security of said ICs. Various attacks have been devised to read data from a secure IC. For instance, so-called focused ion beam (FIB) attacks or probing attacks are quite powerful. Such attacks consist in using failure analysis and wafer level IC debugging equipment to probe and/or force the state of selected signals. In view of the risk created by such attacks, it is important to develop effective countermeasures.

SUMMARY

According to a first aspect of the present disclosure, an integrated circuit is provided which comprises an active shield in a first layer and at least one security-critical component in a second layer, said security-critical component being configured to generate an access key for enabling access to at least a part of said security-critical component, wherein said access key is based on an output value of the active shield.

In one or more embodiments, the security-critical component is further configured to use the access key to enable access to the content of a storage unit comprised in the security-critical component.

In one or more embodiments, said content is encrypted content, and the access key comprises a decryption key for decrypting said encrypted content.

In one or more embodiments, the access key is based on the output value of the active shield and on a fixed random number.

In one or more embodiments, the security-critical component is further configured to generate the access key by performing an exclusive-or operation on the output value of the active shield and said fixed random number.

In one or more embodiments, the security-critical component is further configured to provide an input value to the active shield, said input value being based on a fixed random seed value.

In one or more embodiments, the security-critical component is further configured to mask the input value with a variable random value before providing said input value to the active shield.

In one or more embodiments, the security-critical component is further configured to unmask the output value of the active shield using said variable random value.

In one or more embodiments, the security-critical component is further configured to use Boolean masking for masking the input value and unmasking the output value.

In one or more embodiments, the security-critical component comprises a shield controller which is configured to mask the input value and unmask the output value.

In one or more embodiments, the security-critical component is further configured to generate an error signal if said access is not enabled.

In one or more embodiments, a smart card comprises an integrated circuit of the kind set forth.

In one or more embodiments, an electronic identification document comprises an integrated circuit of the kind set forth.

According to a second aspect of the present disclosure, a method for protecting an integrated circuit is conceived, said integrated circuit comprising an active shield in a first layer and at least one security-critical component in a second layer, wherein the security-critical component generates an access key for enabling access to at least a part of said security-critical component, and wherein said access key is based on an output value of the active shield. According to a third aspect of the present disclosure, a computer program product is provided that comprises instructions which, when being executed by a processing unit, cause said processing unit to carry out a method of the kind set forth.

DESCRIPTION OF DRAWINGS

Embodiments will be described in more detail with reference to the appended drawings, in which.

DESCRIPTION OF EMBODIMENTS

Figure 1:
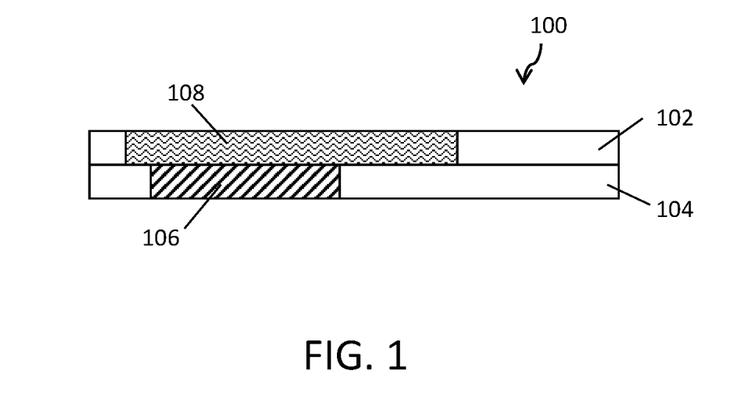
FIG. 1 shows an example of an integrated circuit.

FIG. 1 shows an example of an integrated circuit (IC) 100. The integrated circuit 100 comprises a first layer 102 which comprises an active shield 108. The first layer 102 may be the top layer of the integrated circuit 100. Furthermore, the integrated circuit 100 comprises a second layer 104 which comprises an IC component 106. The second layer 104 may be the layer right beneath the first layer 102 or a lower layer of the IC 100. The IC component 106 may be a security-critical component that implements a secure function and/or in which sensitive data are stored. The active shield 108 may comprise a plurality of conductive wires. In particular, the active shield 108 may comprise a dense mesh of wires transporting random signals.

Figure 2:
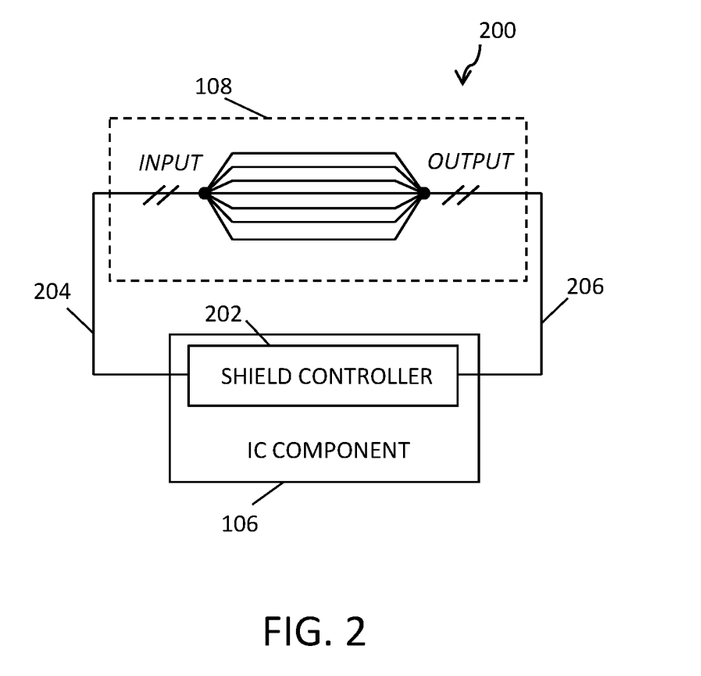
FIG. 2 shows a block diagram illustrating how an active shield may be controlled.

FIG. 2 shows a block diagram 200 illustrating how an active shield may be controlled. As mentioned above, the active shield 108 may comprise a dense mesh of wires transporting random signals. Alternatively, the active shield 108 may be implemented differently, for example as an arrangement of conductive wires and logic units, as described in patent application U.S. 2014/0049359 A1, published on 20 Feb. 2014. The IC component 106 may contain a shield controller 202 connected to an input 204 of the active shield 108 and connected to an output 206 of the active shield 108. The shield controller 202 may generate said random signals and may check their consistency in an attempt to detect damages to the conductive wires. Active shielding is known as such and has been described, for instance, in the article "Random Active Shield" by Sébastien Briais et al., WEE Computer Society, Fault Diagnosis and Tolerance in Cryptography, September 2012, Leuven, Belgium, 2012. As defined therein, active shielding (also referred to as digital shielding) comprises injecting random sequences of bits in a top layer of an IC and checking that they arrive unaltered after their journey through metal connections embedded in said layer. Active shields are designed to prevent probing attacks; however they often generate an error signal which itself can be the target of a probing attack or FIB manipulation. Some implementations extend the number of error signals, but this merely slows down an attacker and does not rule out such attacks.

Therefore, in accordance with the present disclosure, an integrated circuit comprises active shield in a first layer and at least one security-critical component in a second layer, wherein security-critical component is configured to generate an access key for enabling access to at least a part of said security-critical component, and wherein said access key is based on an output value of the active shield. Thus, the risk that the active shield is bypassed is reduced by using its output to access apart of the security-critical component. It is therefore useless to attempt to manipulate the shield's output, because said part of the security-critical component cannot be accessed if the shield is damaged by an attack and a wrong access key is generated as a result of said damage.

In one or more embodiments, the security-critical component is further configured to use the access key to enable access to the content of a storage unit comprised in the security-critical component. This is useful in case sensitive data should be stored and protected. The access key may for example comprise a password or another code which enables access to the content of the storage unit. Alternatively or in addition, the access key may comprise a cryptographic key that may be used to decrypt content stored in said storage unit, for example to decrypt said sensitive data. Thus, in one or more embodiments, the content of the storage unit is encrypted content, and the access key comprises a decryption key for decrypting said encrypted content. This may provide a particularly strong protection against the above-mentioned attacks.

Figure 3:
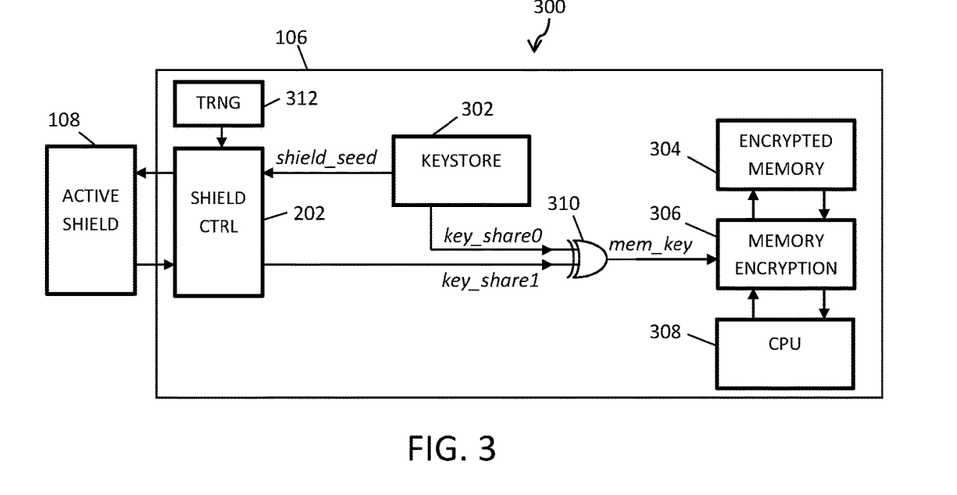
FIG. 3 shows a block diagram representing an illustrative embodiment of an integrated circuit.

FIG. 3 shows a block diagram 300 representing an illustrative embodiment of an integrated circuit. The integrated circuit comprises an active shield 108 and a security-critical IC component 106. The IC component 106 comprises a key store 302, an encrypted memory 304 (i.e., a memory containing encrypted content), a memory encryption block 306 which is operatively connected to the encrypted memory 304, and a central processing unit 308 which is operatively connected to the memory encryption block 306. Furthermore, the IC component 106 comprises an XOR gate 310 for performing exclusive-or operations. Furthermore, the IC component 106 comprises the shield controller 202 and a true random number generator 312 which is configured to provide true random bits to the shield controller 202. The shield controller 202 may mask the input value provided to the active shield 108 and unmask the output value of the active shield 108 using said true random bits, as will be explained in more detail with reference to FIG. 4 and FIG. 6.

The active shield 108 has a data input and a data output. As long as the conductive wires in the shield 108 are not damaged, the output value may be regarded as a deterministic mapping of the input value, denoted shield_map. In other words, as long as the conductive wires are intact, an input value which is transmitted through said wires produces a predictable output value. The size of the output value may match the size of the required decryption key. Alternatively, a compression function or a hash function may be used, if required, to reduce the size of the output value to the decryption key size. The memory encryption block 306 may be configured to encrypt the contents of the memory 304 using an encryption key and to decrypt the contents of the memory 304 using a corresponding decryption key. Furthermore, the decryption key may be the same as the encryption key. The following data may be permanently stored in the key store 302: shield_seed (a random number generated once at the production time of the IC, i.e. a fixed random seed value) and key_share0 (another random number generated once at the production time of the IC, i.e. another fixed random number). The memory encryption block 306 may be controlled by the central processing unit 308.

In operation, the active shield 108 may output key_share1=shield_map (shield_seed). Subsequently, the memory encryption block 306 may use a decryption key which is based on said output, in order to decrypt the content of the memory 304. Optionally, the output of the active shield 108 may be subject to an exclusive-or operation. Thus, the memory encryption block 306 may use the following decryption key: mem_key=key_share0 XOR key_share1. If the active shield 108 is damaged, the shield's output key_share1 will be computed incorrectly and therefore the decryption key mem_key will be incorrect as well. So, although an attacker may be able to probe internal signals, the signals will be meaningless because the content of the memory 304 will be decrypted incorrectly.

It is noted that, although the key store 302 and the encrypted memory 304 have been shown as separate blocks of the IC component 106, they may in fact reside in the same physical memory. In this way, IC area may be saved. For example, the key store 302 may be a small area in said physical memory where no encryption takes place. Although the content of the key store 302 may be accessible by means of optical read-out, in order to access the encrypted memory content, an attacker also needs to know the mapping shield_map. However, this mapping is design information that may be kept secret by the IC manufacturer.

Thus, in one or more embodiments, the access key (e.g., mem_key) is based on the output value (e.g., key_share1) of the active shield and on a fixed random number (e.g., key_share0). In this way, the access key becomes more complex and by consequence more difficult to crack. In a practical and efficient implementation, the security-critical component may be configured to generate the access key by performing an exclusive—or operation on the output value of the active shield and said fixed random number. Furthermore, in one or more embodiments, the security-critical component is further configured to provide an input value to the active shield, said input value being based on a fixed random seed value (e.g., shield_seed). In this way, the resulting access key becomes again more complex.

Figure 4:
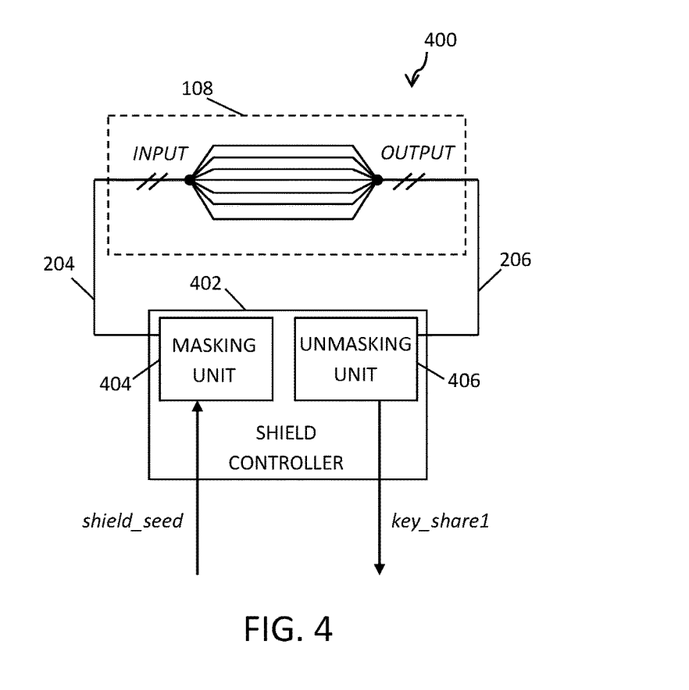
FIG. 4 shows a block diagram illustrating how an active shield may be controlled in accordance with one or more embodiments.

FIG. 4 shows a block diagram 400 illustrating how an active shield may be controlled in accordance with one or more embodiments. Again, the active shield 108 may comprise a dense mesh of wires transporting random signals. The IC component may contain a shield controller 402 connected to an input 204 of the active shield 108 and connected to an output 206 of the active shield 108. The shield controller 402 may generate said random signals and may check their consistency in an attempt to detect damages to the conductive wires. Since the signals are random, it may in practice be difficult to implement the above-mentioned deterministic mapping (shield_map). Therefore, in one or more embodiments, the security-critical component is further configured to mask the input value with a variable random value before providing said input value to the active shield. Furthermore, in one or more embodiments, the security-critical component is further configured to unmask the output value of the active shield using said variable random value. In this way, the signals transmitted through the conductive wires of the active shield 108 may be randomized sufficiently while keeping said deterministic mapping intact. In a practical and efficient implementation, the shield controller 402 is configured to mask the input value and unmask the output value. For example, as shown in FIG. 4, the shield controller 402 may comprise a masking unit 404 configured to mask the input value and an unmasking unit 406 configured to unmask the output value.

In one or more embodiments, Boolean masking may be used for masking the input value and unmasking the output value. Thereby, a simple yet effective implementation may be realized. For example, the shield_map algorithm may require a bit to be in the state 'A'. Then, the masking unit 404 may generate a random bit 'R' and set the associated shield line to 'A' XOR 'R'. At the other end of the shield line the unmasking unit 406 retrieves 'A' by performing an XOR operation on the state on the line with 'R'. The skilled person will appreciate that other methods may be used for masking and unmasking, for example in order to increase the level of security and increase the overall efficiency. However, generally speaking, it can be said that the deterministic state of the shield_map algorithm may be masked with variable random numbers in such a way that the deterministic state can be recovered. The intermediate data between the masking and unmasking operations may then be regarded as sufficiently random and suitable for driving the shield lines or any other structure used by the active shield.

Figure 5:
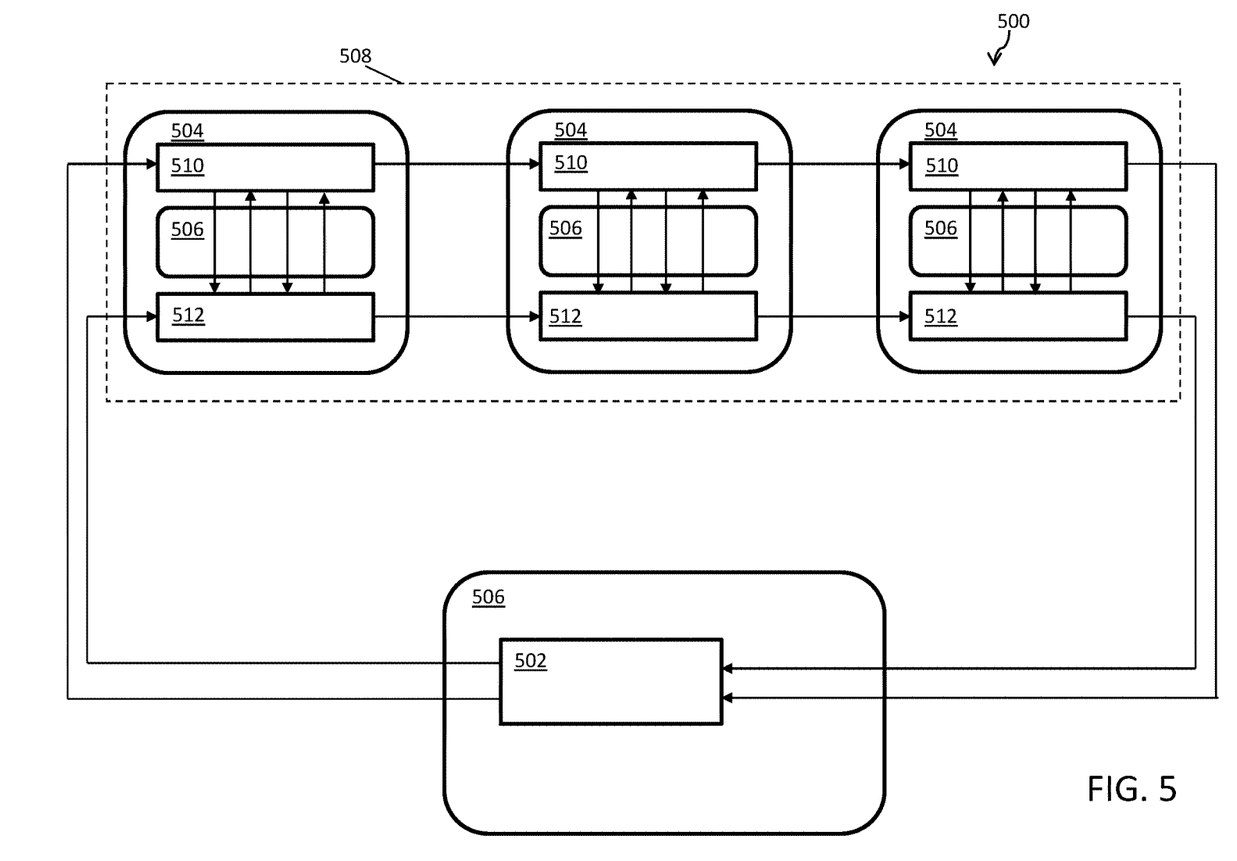
FIG. 5 shows an illustrative embodiment of an active shield implementation.

FIG. 5 shows an illustrative embodiment of an active shield implementation 500. In this example, the active shield implementation 500 comprises a plurality of slices 504, and each slice 504 implements a linear function. Each slice 504 comprises a first logic unit 510, which comprises combinational logic and a memory, and a second logic unit 512, which comprises combinational logic and optionally a memory. Shield lines, which are positioned above the protected area and in particular above the security-critical IC component 506, transport bits between the first logic unit 510 and the second logic unit 512. The shield controller 502 comprised in the security-critical component 506 is configured to provide serial data and control signals to the first logic unit 510 of the first slice (i.e. the left slice). Furthermore, the shield controller 502 is configured to provide serial data and optionally control signals to the second logic unit 512 of the first slice. In operation, the combinational logic performs transformations on the serial data under control of the control signals, thereby implementing the aforementioned linear function. Intermediate data may be stored in the memory comprised in the logic units 510, 512. Thus, the active shield may be grouped in slices and each slice may implement the same linear function. The shield controller 502 may drive the first slice and the data may be shifted through the slices; this process may be regarded as similar to the process executed by a shift register. Each slice, except the first slide, accepts as input the output of the previous slice. The shield controller 502 receives the output of the last slice (i.e. the right slice) and uses it to generate an access key of the kind set forth. The skilled person will appreciate that the number of slices can be different from the number shown; it is emphasized that FIG. 5 merely shows an example with a small number of slices in order to illustrate the principle. The linear function implemented by the slices may accept a plurality of input bits so as to produce a large number of intermediate values. The use of slices which implement a linear function may result in a reduced complexity of the shield controller, and consequently in a practical and efficient implementation of the active shield.

Figure 6:
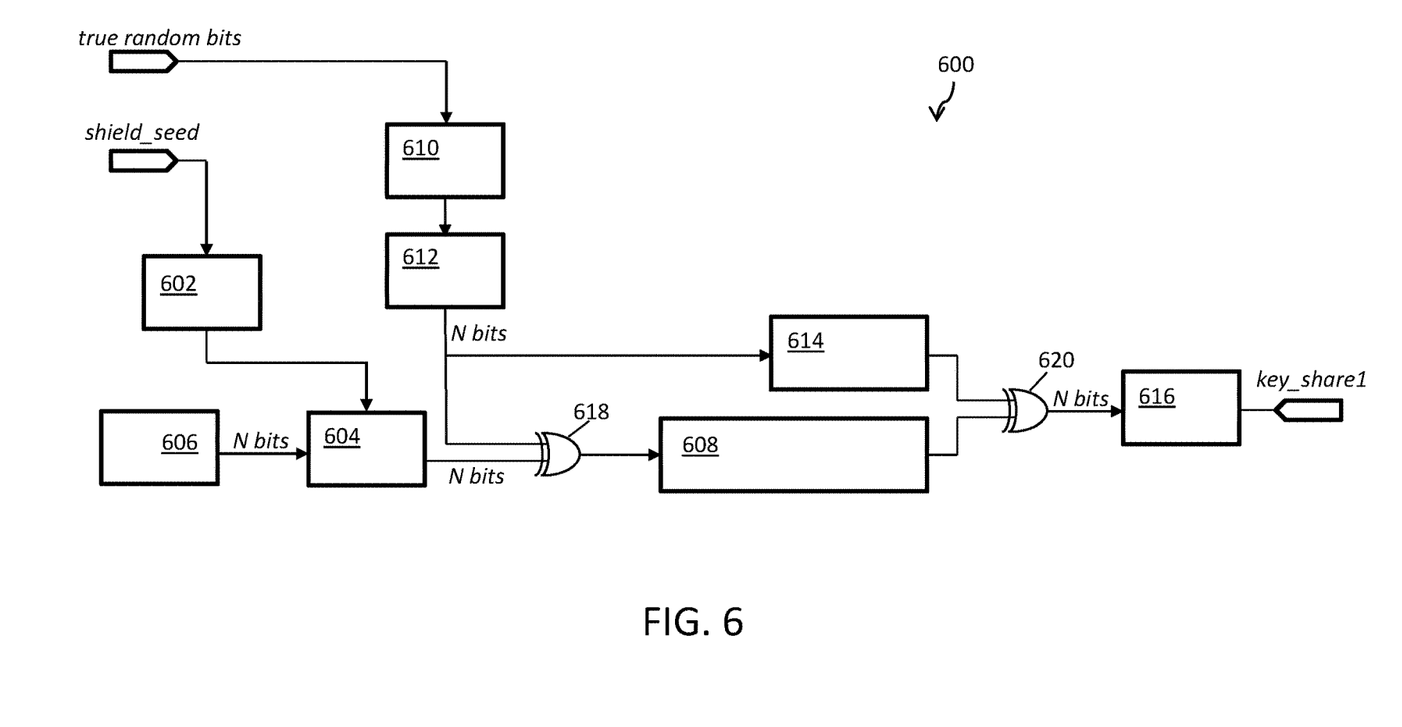
FIG. 6 shows an illustrative embodiment of a data flow of an active shield implementation.

FIG. 6 shows an illustrative embodiment of a data flow 600 of an active shield implementation. In this example, the data flow 600 comprises an active shield 608 which includes a slice function (referred to as a "linear slice function") based on a plurality of slices which implement a linear function, as described with reference to FIG. 5. All other functional blocks in the data flow are implemented in the shield controller. In particular, those functional blocks comprise a set of elements involved in masking and unmasking the input value and the output value, respectively, of the active shield: a buffer 610 receiving true random bits as an input, a pseudo-random number generator 602 receiving input from said buffer 610, an XOR gate 618 receiving input from the pseudo-random number generator 602, a linear slice function 614 which corresponds to the linear slice function included in the active shield 608 and which receives input from the pseudo-random number generator 602, and an XOR gate 620 which receives input from the slice function 614 and the active shield 608. Furthermore, the data flow 600 comprises another pseudo-random number generator 602 which receives the seed value shield_seed as an input, an N-bit counter 606 which counts the number of input values provided to the slice function, an N-bit encryption function 604 which receives input from the pseudo-random number generator 602 and form the N-bit counter 606 and which sends its output to the XOR gate 618, and a hash function 616 receiving input from the XOR gate 620 and producing as output the output value key_share1.

The data flow 600 may form part of a test procedure which effectively tests whether the active shield 608 has been damaged in order to determine whether the integrated circuit has been tampered with. If N is the number of serial bits for one slice and M is the number of slices, then a single pass may be defined as M steps of the pseudo-random number generators 602, 612. Furthermore, a single test may comprise $2^N$ passes, or $2^{N}*2$ passes if the slices use latches as memory elements; this number of passes makes sure that all possible input values are provided to the slice function and thus it represents the minimum amount of work which is required to produce the output value key_share1 while ensuring that all shield lines are intact. For each pass, the pseudo-random number generators 602, 612 are reset (i.e., the seed of the pseudo-random number generators 602 is reloaded for each pass). At each step, the pseudo-random number generators 602, 612 produce a new random value, and for each slice the pseudo-random number generators 602, 612 produce such a new random value. For each test the N-bit counter is reset to its initial value, and at each pass, the N-bit counter 606 (which may also be referred to as a pass counter) produces a new value (i.e., it is incremented). The active shield 608 has a serial data input, a serial data output and may be regarded as a shift register with M stages, wherein each stage involves a slice that is configured to shift N transformed bits to a next slice. The buffer 610, pseudo-random number generator 612 and slice function 614 do not operate on any data related to the seed value shield_seed but only operate on true random data; they are used for masking the input value to the active shield 608 and unmasking the output value of the active shield 608. The N-bit encryption function 604 is used to diversify the counter value in dependence on the seed value shield_seed. The N-bit encryption function 604 outputs a deterministic input for the active shield 608, which is masked by the output of the pseudo-random number generator 612 at the XOR gate 618. Accordingly, the XOR gate 618 outputs a random input for the active shield 608. Likewise, the output of the active shield 608 is random, and is unmasked at the XOR gate 620. Accordingly, the XOR gate 620 outputs a deterministic input for the hash function 616.

Furthermore, in one or more embodiments, the security-critical component is configured to generate an error signal if the access to it is not enabled. As mentioned above, in case of a damaged active shield 108, the content of the memory 304 will be incorrectly decrypted. However, in the absence of any error indication, it may be difficult to predict the behavior of the system. Therefore, the security-critical component 106 may generate an error signal which is output to a device external to the IC, for example. If a deterministic error signal is desired, the system may read at a special location in the encrypted memory 304 where a well-known value is stored. If the value is wide enough, for example 128 bits, the probability that the expected value is obtained with an incorrect decryption key is negligible. Another approach is to compute a cyclic redundancy check (CRC) over mem_key and compare it with an expected value stored in the key store 302.

The functional blocks and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form. As used herein, the term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "storage unit" or "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 integrated circuit
102 top layer
104 lower layer
106 IC component
108 active shield 200 block diagram
202 shield controller
204 shield input
206 shield output
300 block diagram
302 key store
304 encrypted memory
306 memory encryption block
308 central processing unit
310 XOR gate
312 true random number generator
400 block diagram
402 shield controller
404 masking unit
406 unmasking unit
500 active shield implementation
502 shield controller
504 slice
506 IC component
508 active shield
510 combinational logic and memory
512 combinational logic and optional memory
600 active shield implementation data flow
602 pseudo-random number generator
604 N-bit encryption
606 N-bit counter
608 active shield including linear slice function
610 buffer
612 pseudo-random number generator
614 linear slice function
616 hash function
618 XOR gate
620 XOR gate

The invention claimed is:

1. An integrated circuit comprising;
an active shield in a first layer and a security-critical component in a second layer, said security-critical component being configured to generate an access key for enabling access to at least a part of said security-critical component and use the access key to enable access to content of a storage unit comprised in the security-critical component, wherein said access key is based on an output value of the active shield and on a fixed random number generated once at a production time of the integrated circuit.

2. The integrated circuit as claimed in claim 1, wherein said content is encrypted content, and the access key comprises a decryption key for decrypting said encrypted content.

3. The integrated circuit as claimed in claim 1, the security-critical component further being configured to generate the access key by performing an exclusive-or operation on the output value of the active shield and said fixed random number.

4. The integrated circuit as claimed in claim 1, the security-critical component further being configured to provide an input value to the active shield, said input value being based on a fixed random seed value.

5. The integrated circuit as claimed in claim 4, wherein the fixed random seed value is generated once at a production time of the integrated circuit.

6. The integrated circuit as claimed in claim 4, the security-critical component further being configured to mask the input value with a variable random value before providing said input value to the active shield.

7. The integrated circuit as claimed in claim 6, the security-critical component further being configured to unmask the output value of the active shield using said variable random value.

8. The integrated circuit as claimed in claim 7, the security-critical component further being configured to use Boolean masking.

9. The integrated circuit as claimed in claim 7, wherein the security-critical component comprises a shield controller which is configured to mask the input value and unmask the output value.

10. The integrated circuit as claimed in claim 1, the security-critical component further being configured to generate an error signal if said access is not enabled.

11. A smart card comprising the integrated circuit as claimed in claim 1.

12. An electronic identification document comprising the integrated circuit as claimed in claim 1.

13. The integrated circuit as claimed in claim 1, wherein the active shield comprises a plurality of slices and each slice is configured to implement a linear function.

14. The integrated circuit as claimed in claim 13, wherein each slice comprises a first logic unit and a second logic unit and shield lines transport bits between the first logic unit and the second logic unit.

15. The integrated circuit as claimed in claim 13, wherein each slice, except a first slice, is configured to accept as input an output of a previous slice and a shield controller is configured to receive an output of a last slice and generate the access key.

16. A method for protecting an integrated circuit, said integrated circuit comprising:
an active shield in a first layer and a security-critical component in a second layer, wherein the security-critical component generates an access key for enabling access to at least a part of said security-critical component and using the access key to enable access to content of a storage unit comprised in the security-critical component, and wherein said access key is based on an output value of the active shield and on a fixed random number generated once at a production time of the integrated circuit.

17. An article of manufacture including a non-transitory computer-readable storage medium having a computer program stored thereon that comprises executable instructions which, when being executed by a processor, cause the processor to perform an integrated circuit protection method for an integrated circuit comprising an active shield in a first layer and a security-critical component in a second layer, the article of manufacture comprising:
instructions for generating an access key to enable access to at least a part of said security-critical component; and instructions for using the access key to enable access to content of a storage unit comprised in the security-critical component, wherein the access key is based on an output value of the active shield and on a fixed random number generated once at a production time of the integrated circuit.

* * * * *